Patented Jan. 20, 1931

1,789,335

UNITED STATES PATENT OFFICE

HERBERT G. M. FISCHER, OF WESTFIELD, AND WILLIAM J. ADDEMS, OF ELIZABETH, NEW JERSEY, ASSIGNORS TO STANDARD OIL DEVELOPMENT COMPANY, A CORPORATION OF DELAWARE

PROCESS OF TREATING SULPHUR-CONTAINING OILS

No Drawing.   Application filed May 8, 1926. Serial No. 107,787.

This invention relates to improvements in methods for reducing or eliminating the sulphur content of hydrocarbon oils, or for making the sulphur content unobjectionable. The invention has particular reference to the "sweetening" of kerosene and will be described for illustration in this connection. However, the process may be applied also to naphthas and other oils.

It is well known that the "sourness" of kerosene is caused by the presence in it of organic sulphur compounds, chiefly mercaptans, of the type R.HS. According to usual practice, sour oils are sweetened by treatment with "doctor solution" (an aqueous solution of sodium plumbite) with or without the addition of elementary sulphur. Oils containing a high percentage of sulphur in organic combination, for example kerosene from Reagan crude, when treated according to prior practice require a very large amount of doctor solution, and the expense of sweetening by means of this reagent is practically prohibitive.

We have found that sour oils of the type referred to may be successfully and economically treated by the following method: The oil is mixed in an agitator of suitable type, either batch or continuous, with elementary surphur, a 15° Bé. solution of sodium hydroxid, and lead sulfid. The agitation may be by air blowing at ordinary temperature. The amount of sulphur to be added is determined primarily by the quantity of mercaptan sulphur present in the oil. Enough elementary sulphur is added to convert the mercaptans into polysulfids, which may be of the type $R_2S_3$. Oxygen derived from the air used for agitation or from any other suitable source, is desirable but not necessary.

Our experiments have shown that the oil is sweetened by adding sulphur in amount about equal to one-half the mercaptan sulphur. The added sulphur, which is apparently fixed in organic combination, does not make the oil corrosive. The sodium hydroxid and lead sulfid appear to act catalytically. The lead sulfid may be separated after the treatment is finished and reused as it is, without any revivifying or reconditioning.

Although the oil is sweet, or substantially so, after the treatment described, the sulphur content may be too high; the oil may not pass the standard sulphur-content tests. An important feature of our invention is the distillation of the oil under regulated conditions to free it from the sulphur compounds. The polysulfids are relatively high boiling as compared with the mercaptans and may be separated from the oil by distilling it at temperatures in general not exceeding about 320° F. At higher temperatures the polysulfids decompose, producing volatile mercaptans and hydrogen sulfid, with resulting contamination of the distilled oil. With most stocks it is necessary to distill under vacuum to volatilize the oil below the temperature stated. A naphtha fraction may be taken off with fire and steam distillation, vacuum being applied to obtain the kerosene fraction. The residue in the still is a concentrate of the polysulfids. The distillate is oil of very low sulphur content. It may in some cases be slightly sour, in which case a light treatment with doctor solution suffices to sweeten the oil. However, if care is taken to sweeten the oil completely before distillation, the distillate will be sweet.

The following example giving weights of the reagents used is illustrative: 2020 lbs. of sulphur, preferably as flowers of sulphur, and 1100 lbs. of lead sulfid were added to 5500 bbls. of kerosene from Reagan crude in an agitator. Then 2500 gals. of 15° Bé. sodium hydroxid solution was supplied to the agitator. The charge was agitated for about 1½ hours at ordinary temperature, allowed to settle, and was then drawn off and distilled as above described, taking overhead 91% with a loss of 1% and leaving 8% in the still.

The kerosene stock had an initial total sulphur content of 0.264%, of which 82% was mercaptan sulphur. The kerosene distillate was sweet, as shown by the doctor test. The sweetened stock before distillation had a sulphur content of 0.372% and was non-corrosive, as shown by the copper strip test for one hour at 212° F. The kerosene after distillation had a sulphur content of only 0.108%. Its original color and color stability were excellent. It showed a loss of only two color shades (Saybolt refined oil colorimeter) after heating to 212° F. for 16 hours. The kerosene gave no corrosion on the copper strip test for one hour at 212° F. The odor of the kerosene was good and was not affected by heating. The bottoms in the still had a sulphur content of 3.15%.

Acid treatment is not ordinarily necessary when proceeding according to our process, but is frequently beneficial. The polysulfids formed are quite soluble in sulphuric acid and are not substantially decomposed by it. The stock may therefore be acid treated before distillation, if desired. As an example, kerosene from Reagan crude was treated with 6 lbs. of restored 66° Bé. sulphuric acid per bbl. of kerosene after the sweetening treat. This lowered the sulphur content of the stock to 0.342%. After distillation, conducted under substantially the same conditions as before, the kerosene distillate (90.5% of the charge) had a sulphur content of only 0.066%. It had a color and color stability better in some respects than when the acid treatment was omitted. The kerosene was only slightly sour after distillation, requiring 25 lbs. of lead oxid to sweeten 5500 bbls. of oil. The bottoms in the still had a sulphur content of 3.8%.

It is sometimes desirable to add the sulphur in the form of an aqueous solution of an alkali metal sulfid or polysulfid, especially sodium sulfid. Solutions of sulphur in hydrocarbon oils are also suitable. Preformed lead sulfid, alkali, and oxygen are used as described.

In case the oil originally contains some corrosive (elementary) sulphur and/or hydrogen sulfid, such elementary or combined sulphur will be fixed by the mercaptans when the oil is treated in the presence of lead sulfid and sodium hydroxid as above described. Care should be taken that the sulphur added, together with the elementary sulphur already present in the oil is not in excess of the amount required to form polysulfids. Any such excess sulphur, unless removed, would make the oil corrosive.

The distillation step may be omitted in the case of oils having a low mercaptan sulphur content. The treatment of these oils according to our invention will comprise agitation with sodium hydroxid solution, sulphur and lead sulfid, as above described. After the reaction is completed the lead sulfid will be settled out. The oil contains an increased amount of sulphur but is sweet and noncorrosive. If the percentage of total sulphur at the completion of the reaction is within permissible limits, the distillation may be omitted.

In some cases we may form the lead sulfid in the body of oil, as by reaction with hydrogen sulfid upon sodium plumbite carried by the oil, or in other suitable ways. In all cases, however, we use an amount of lead (as sodium plumbite) much less than would be required to sweeten the oil according to prior practice. That is, we do not add enough lead to convert all the mercaptans into lead mercaptides but only enough to produce a substantial quantity of lead sulfid. The amount of lead sulfid used in all the embodiments of our invention may be varied widely. A reasonably large amount is necessary to secure reaction of the desired rapidity. Instead of lead sulfid we may use other heavy metal sulfids having equivalent properties for this reaction, especially cupric or cuprous sulfid.

It will be understood that the foregoing examples are illustrative and that various changes may be made within the scope of the appended claims, in which it is our intention to claim all novelty inherent in the invention as broadly as the prior art permits.

We claim:

1. Process of treating hydrocarbons containing mercaptans, comprising bringing the hydrocarbons into contact with a preformed heavy metal sulfid, an alkali, and sulphur in amount sufficient to convert at least the greater part of the mercaptans into polysulfids.

2. Process of treating petroleum oil containing mercaptans, comprising agitating the oil with preformed lead sulfid, sodium hydroxid, and sulphur in amount sufficient to convert the mercaptans into polysulfids.

3. Process of treating a sour petroleum distillate, comprising agitating the distillate with sulphur in the presence of a heavy metal sulfid and an alkali, whereby sweet sulphur compounds are formed, distilling the distillate below a temperature at which the sweet sulphur compounds are substantially removed from the distillate, and taking off a distillate substantially free from sulphur.

4. Process of treating a sour petroleum distillate, comprising agitating the distillate with sulphur in the presence of preformed lead sulfid and a water solution of sodium hydroxid, whereby sweet sulphur compounds are formed, distilling the distillate below a temperature at which the sweet sulphur compounds are substantially removed from the distillate, and taking off a distillate substantially free from sulphur.

5. Process according to claim 4, in which the substantially sulphur-free distillate is given a final light treatment with doctor solution.

6. Process of sweetening petroleum distillates containing sour sulphur compounds, comprising agitating the distillate with sulphur in the presence of preformed lead sulfid and an alkali, whereby the sour compounds are converted into compounds of higher boiling point, distilling the distillate at a temperature not substantially above 320° F., and taking off a distillate substantially free from sulphur.

7. Process of treating petroleum hydrocarbons containing sour sulphur compounds of the type of mercaptans, comprising mixing the hydrocarbons with sulphur in the presence of lead sulfid and an alkali, the total amount of lead in the mixture being insufficient to directly convert more than a small proportion of the mercaptans into lead mercaptides.

8. Process of treating a sour petroleum distillate, comprising agitating the distillate with sulphur in the presence of lead sulfid and a water solution of sodium hydroxid, whereby sweet sulphur compounds are formed, acid treating the distillate, settling and drawing off the acid treated distillate, and distilling the distillate at a temperature below that at which the sweet sulphur compounds are substantially removed from the distillate.

9. In the treating of petroleum hydrocarbons containing sour sulphur compounds of the type of mercaptans, the improvement that comprises mixing the hydrocarbons with preformed lead sulfid, alkali, and sulphur in amount about equivalent to one-half the sulphur content of the mercaptans, whereby polysulfids are formed.

10. Process according to claim 9, in which the mixing is by blowing with air.

11. Process according to claim 9, in which the treated oil is distilled at a temperature below that at which the polysulfids decompose, whereby they are concentrated in the distillation residue.

12. Process of treating sour petroleum oil, comprising agitating the oil with sulphur in the presence of preformed lead sulfid, sodium hydroxide, and oxygen.

13. Process of treating sour petroleum oil comprising adding to the oil a preformed heavy metal sulfid, sulphur, and sodium hydroxide, and agitating the oil by blowing with air.

HERBERT G. M. FISCHER.
WILLIAM J. ADDEMS.